(12) United States Patent
Jung et al.

(10) Patent No.: US 10,302,917 B2
(45) Date of Patent: May 28, 2019

(54) SUPER WIDE-ANGLE LENS AND IMAGING DEVICE INCLUDING THE SAME

(71) Applicant: ACE SOLUTECH CO., LTD., Seongnam-si, Gyeonggi-do (KR)

(72) Inventors: Pil Sun Jung, Gyeonggi-do (KR); Dong Young Kim, Gyeonggi-do (KR); Chi Ho An, Gyeonggi-do (KR)

(73) Assignee: ACE SOLUTECH CO., LTD. (KR)

( * ) Notice: Subject to any disclaimer, the term of this patent is extended or adjusted under 35 U.S.C. 154(b) by 0 days.

(21) Appl. No.: 15/461,917

(22) Filed: Mar. 17, 2017

(65) Prior Publication Data
US 2017/0269342 A1  Sep. 21, 2017

(30) Foreign Application Priority Data
Mar. 18, 2016 (KR) .................. 10-2016-0032922

(51) Int. Cl.
*G02B 9/62* (2006.01)
*G02B 13/06* (2006.01)
*G02B 13/00* (2006.01)

(52) U.S. Cl.
CPC ............... *G02B 13/06* (2013.01); *G02B 9/62* (2013.01); *G02B 13/0045* (2013.01)

(58) Field of Classification Search
CPC .................................. G02B 9/62; G02B 9/64
USPC ................. 359/713, 749–752, 754–756, 761
See application file for complete search history.

(56) References Cited

U.S. PATENT DOCUMENTS

| | | | |
|---|---|---|---|
| 9,557,534 B1* | 1/2017 | Liao | G02B 13/0045 |
| 2015/0268446 A1* | 9/2015 | Chen | G02B 9/62 348/148 |
| 2016/0124185 A1* | 5/2016 | Tang | G02B 13/18 359/713 |
| 2016/0178871 A1* | 6/2016 | You | G02B 13/0045 359/713 |
| 2016/0223796 A1 | 8/2016 | Lee et al. | |

FOREIGN PATENT DOCUMENTS

KR      20160094215      9/2016

* cited by examiner

*Primary Examiner* — Darryl J Collins
(74) *Attorney, Agent, or Firm* — Perman & Green, LLP (57) ABSTRACT

Provided are a super wide-angle lens and an imaging device including the same. The super wide-angle lens includes first to sixth lenses arranged from an object side toward an image plane side in this stated order and respectively having negative, positive, positive, negative, positive, and negative refractive powers. The super wide-angle lens may have a field of view of 100 degree or more.

19 Claims, 7 Drawing Sheets

SUPER WIDE-ANGLE LENS AND IMAGING DEVICE INCLUDING THE SAME

CROSS-REFERENCE TO RELATED APPLICATION

This application claims the benefit of Korean Patent Application No. 10-2016-0032922, filed on Mar. 18, 2016, in the Korean Intellectual Property Office, the disclosure of which is incorporated herein in its entirety by reference.

BACKGROUND

1. Field

One or more aspects of the disclosed embodiment relate to a super wide-angle lens and an imaging device including the same.

2. Brief Description of the Related Developments

Imaging devices including solid-state imaging elements such as charge-coupled device (CCD) type image sensors or complementary metal-oxide semiconductor (CMOS) type image sensors are widely used. Users have a demand for high resolution and high quality of imaging devices including solid-state imaging elements, such as digital cameras, interchangeable lens systems, video cameras, and the like. Imaging devices including solid-state imaging elements are suitable for size reduction and thus applied to small-size information terminals and the like, including mobile phones, in recent years.

With increasing use of cameras, there is an increasing demand for single focus lenses such as telephoto lenses or wide-angle lenses. In addition, super wide-angle lenses having an extremely large field of view of about 180° are recently widely used by high-end camera users, as a means for obtaining artistic expression.

It is also requested that super wide-angle lenses have compact sizes for easy portability as well as have excellent resolution in accordance with pixel increase of digital cameras.

SUMMARY

One or more aspects of the disclosed embodiment include a small-size super wide-angle lens and an imaging device including the small-size super wide-angle lens.

Additional aspects of the disclosed embodiment will be set forth in part in the description which follows and, in part, will be apparent from the description, or may be learned by practice of the presented aspects of the disclosed embodiment.

According to one or more aspects of the disclosed embodiment, a super wide-angle lens includes: a first lens having a negative refractive power; a second lens having a positive refractive power; a third lens having a positive refractive power; a fourth lens having a negative refractive power; a fifth lens having a positive refractive power; and a sixth lens having a negative refractive power, wherein the first to sixth lenses are arranged from an object side toward an image plane side in this stated order, and the super wide-angle lens satisfies all of the following conditions:

$100 < FOV < 160$               Condition (1)

$0.7 < TTL/IH < 1.0$               Condition (2)

where FOV (unit: °) refers to a field of view of the super wide-angle lens, TTL (unit: mm) refers to a distance from a center of an entrance surface of the first lens to the image plane, and IH (unit: mm) refers to an image height.

In one aspect of the disclosed embodiment, the super wide-angle lens may satisfy the following condition:

$0.7 < Ind3/Ind4 < 1.5$               Condition (3)

where Ind3 and Ind4 respectively refer to refractive indices of the third lens and the fourth lens.

In another aspect of the disclosed embodiment, the super wide-angle lens may satisfy the following condition:

$DiaL3 < DiaL1 < DiaL6$               Condition (4)

where DiaL1, DiaL3, and DiaL6 respectively refer to effective diameters of the first lens, the third lens, and the sixth lens.

In a further aspect of the disclosed embodiment, the super wide-angle lens may satisfy the following condition:

$0.3 < (L1toL2)/OAL < 0.45$               Condition (5)

where L1toL2 (unit: mm) refers to a distance between the center of the entrance surface of the first lens and a center of an exit surface of the second lens, and OAL (unit: mm) refers to a distance between the center of the entrance surface of the first lens and a center of an exit surface of the sixth lens.

The super wide-angle lens may further include an aperture stop between the second lens and the third lens.

In yet another aspect of the disclosed embodiment, the super wide-angle lens may satisfy at least one of the following conditions:

$1.5 < Abv3/Abv4 < 3.0$               Condition (6)

$0.7 < Ind3/Ind6 < 1.5$               Condition (7)

$1.5 < Abv3/Abv6 < 3.0$               Condition (8)

where Abv3, Abv4, and Abv6 respectively refer to Abbe's numbers of the third lens, the fourth lens, and the sixth lens, and Ind3 and Ind6 respectively refer to refractive indices of the third lens and the sixth lens.

At least one of the first to sixth lenses may be an aspheric lens.

At least one of the first to sixth lenses may be a plastic lens.

An exit surface of the first lens may be concave toward the image plane side.

At least one of an entrance surface and an exit surface of the sixth lens may have at least one inflection point.

The at least one of the entrance surface and the exit surface of the sixth lens may be concave toward the image plane side in a central portion thereof and may become convex toward the image plane side in a region between the central portion and an edge thereof.

The entrance surface of the first lens may have a meniscus shape convex toward the object side.

According to one or more aspects of the disclosed embodiment, a super wide-angle lens includes a front lens group, an aperture stop, and a rear lens group, which are arranged from an object side toward an image plane side in this stated order, wherein the front lens group includes a first lens having an exit surface concave toward the image plane side, and a second lens having an entrance surface convex toward the object side; the rear lens group includes a third lens arranged closest to the object side and having an exit surface concave toward the image plane side, and an image plane lens arranged closest to the image plane side and having a negative refractive power; and the super wide-angle lens satisfies all of the following conditions:

$100 < FOV < 160$               Condition (1')

$0.7 < Ind3/Ind4 < 1.5$               Condition (2')

where FOV (unit: °) refers to a field of view of the super wide-angle lens, and Ind3 and Ind4 respectively refer to refractive indices of the third lens and the fourth lens.

In one aspect of the disclosed embodiment, the super wide-angle lens may satisfy all of the following conditions:

$$DiaL3 < DiaL1 < DiaL6 \quad \text{Condition (3')}$$

$$0.7 < TTL/IH < 1.0 \quad \text{Condition (4')}$$

where DiaL1, DiaL3, and DiaL6 respectively refer to effective diameters of the first lens, the third lens, and the image plane lens, TTL (unit: mm) refers to a distance from a center of an entrance surface of the first lens to the image plane, and IH (unit: mm) refers to an image height.

In another aspect of the disclosed embodiment, the super wide-angle lens may satisfy the following condition:

$$0.3 < (L1toL2)/OAL < 0.45 \quad \text{Condition (5')}$$

where L1toL2 (unit: mm) refers to a distance between a center of an entrance surface of the first lens and a center of an exit surface of the second lens, and OAL (unit: mm) refers to a distance between the center of the entrance surface of the first lens and a center of an exit surface of the image plane lens.

The rear lens group may further include a fourth lens having a negative refractive power, and a fifth lens having a positive refractive power, the fourth lens and the fifth lens being arranged between the third lens and the image plane lens and from the object side toward the image plane side in this stated order.

In a further aspect of the disclosed embodiment, the super wide-angle lens may satisfy at least one of the following conditions:

$$1.5 < Abv3/Abv4 < 3.0 \quad \text{Condition (6')}$$

$$0.7 < Ind3/Ind6 < 1.5 \quad \text{Condition (7')}$$

$$1.5 < Abv3/Abv6 < 3.0 \quad \text{Condition (8')}$$

where Abv3, Abv4, and Abv6 respectively refer to Abbe's numbers of the third lens, the fourth lens, and the image plane lens, and Ind3 and Ind6 respectively refer to refractive indices of the third lens and the image plane lens.

At least one of entrance and exit surfaces of the image plane lens may have at least one inflection point between a central portion and an edge of the at least one surface.

At least one of the lenses constituting the front lens group and the rear lens group may be an aspheric lens.

According to one or more aspects of the disclosed embodiment, an imaging device may include: the super wide-angle lens according to the embodiments as set forth above; and a solid-state imaging element taking an image formed by the super wide-angle lens.

BRIEF DESCRIPTION OF THE DRAWINGS

These and/or other aspects of the disclosed embodiment will become apparent and more readily appreciated from the following description of the aspects of the disclosed embodiment, taken in conjunction with the accompanying drawings in which.

DETAILED DESCRIPTION

Reference will now be made in detail to the aspects of the disclosed embodiment, examples of which are illustrated in the accompanying drawings, wherein like reference numerals refer to like elements throughout. In this regard, the present aspects of the disclosed embodiment may have different forms and should not be construed as being limited to the descriptions set forth herein. Accordingly, the aspects of the disclosed embodiment are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As used herein, the term "image plane (IP)" refers to a plane on which an image is formed through a super wide-angle lens, and the term "image plane side" may refer to a direction in which an image device such as an image sensor is located. As used herein, the term "object side" and the term "image plane side" may refer to directions opposite to each other, based on a super wide-angle lens. In addition, out of both surfaces of a lens, a surface at the object side may be referred to as an entrance surface, and a surface at the image plane side may be referred to as an exit surface.

Figure 1:
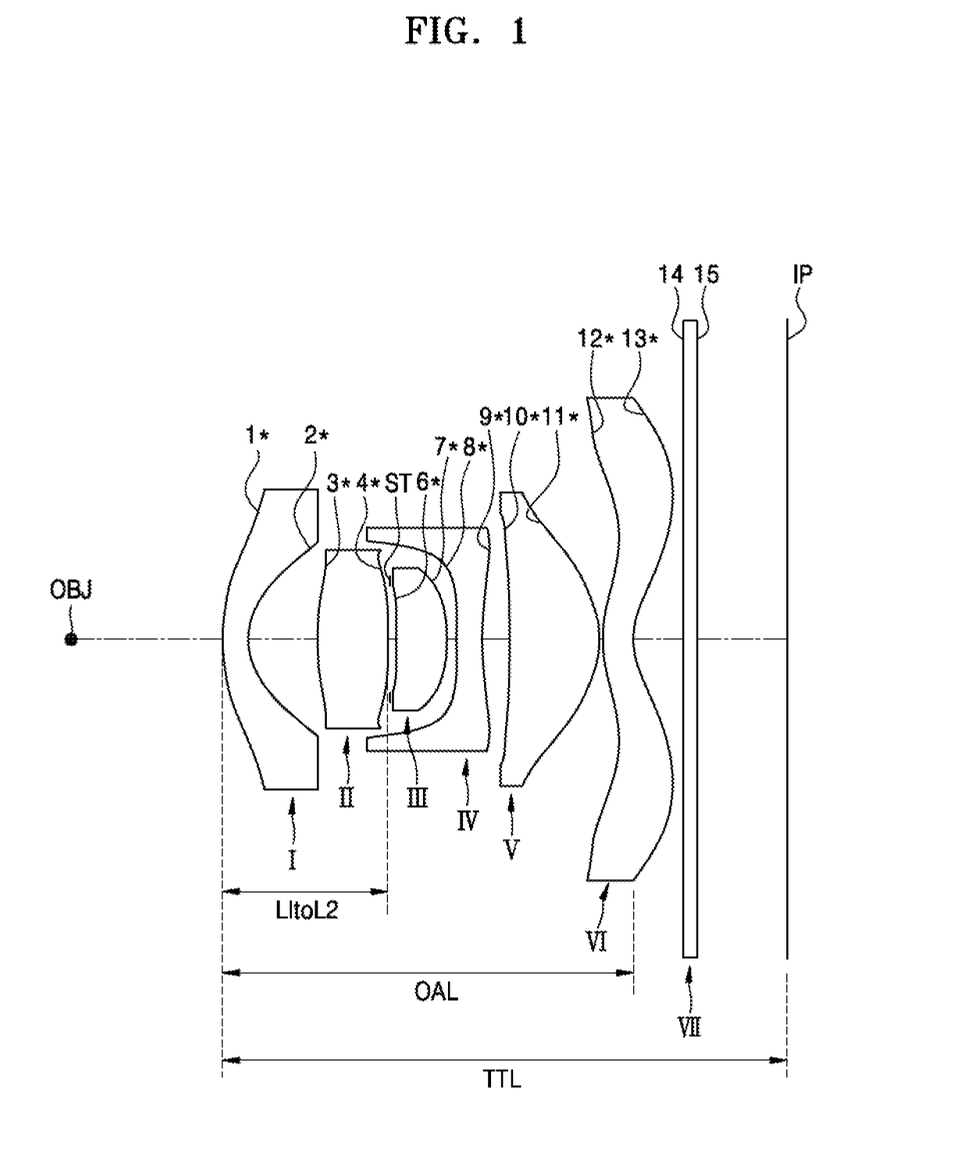
FIG. 1 is a schematic cross-sectional view illustrating an arrangement of main components of a super wide-angle lens according to a first aspect of the disclosed embodiment.

FIG. 1 is a schematic cross-sectional view illustrating an arrangement of main components of a super wide-angle lens according to a first aspect of the disclosed embodiment.

The super wide-angle lens includes a front lens group, an aperture stop ST, and a rear lens group, which are arranged from an object OBJ side toward an image plane IP side in this stated order. The front lens group and the rear lens group may be divided based on the aperture stop ST, and if there is no aperture stop, the front lens group and the rear lens group may be divided based on a plane of a fixed aperture stop controlling light.

The front lens group may include, for example, a first lens I having a negative refractive power and a second lens II having a positive refractive power.

The first lens I may include, for example, an exit surface 2* concave toward the image plane IP side. The first lens I may include, for example, an entrance surface 1* convex toward the object OBJ side. The first lens I may have a meniscus shape convex toward the object OBJ side.

The second lens II may include, for example, an exit surface 4* convex toward the image plane IP side. The second lens II may include, for example, an entrance surface 3* convex toward the object OBJ side. The second lens II may have, for example, a biconvex shape.

The rear lens group may include, for example, a third lens III having a positive refractive power, a fourth lens IV having a negative refractive power, a fifth lens V having a positive refractive power, and a sixth lens IV having a negative refractive power.

Chromatic aberration of the super wide-angle lens may be easily controlled by performing refractive power arrangement of the front lens group and the rear lens group, as described above. In addition, the aperture stop ST is arranged between the front lens group and the rear lens group, whereby optical power may be distributed such that the super wide-angle lens according to the presently disclosed embodiment exhibits sufficient performance at super wide angles.

The third lens III may have, for example, an exit surface 7* convex toward the image plane IP side. The third lens III may have, for example, a meniscus shape convex toward the image plane IP side, or a biconvex shape. When the third lens III has a meniscus shape, astigmatism of the super wide-angle lens may be effectively corrected.

The fourth lens IV may include, for example, an exit surface 9* concave toward the image plane IP side.

The fifth lens V may include, for example, an exit surface 11* convex toward the image plane IP side. The fifth lens V may have, for example, a meniscus shape convex toward the image plane IP side.

For example, at least one of an entrance surface 12* and an exit surface 13* of the sixth lens VI may have at least one inflection point. An inflection point may refer to a point at which the sign of a radius of curvature changes from (+) to (−) or from (−) to (+). Alternatively, an inflection point may refer to a point at which the shape of a lens changes from a convex shape to a concave shape or from a concave shape to a convex shape. The sixth lens VI may have, for example, a meniscus shape convex toward the object OBJ side in a central portion (within a certain radius from an optical axis) of a surface thereof. For example, the exit surface 13* of the sixth lens VI may have a shape concave toward the image plane IP side in the vicinity of an optical axis of the sixth lens VI, and may have a shape convex toward the image plane IP side in a region between the vicinity of the optical axis and an edge of the sixth lens. For example, the entrance surface 12* of the sixth lens VI may have a shape convex toward the object OBJ side in the vicinity of the optical axis of the sixth lens VI, and may have a shape concave toward the object OBJ side in the region between the vicinity of the optical axis and the edge of the sixth lens.

The super wide-angle lens may further include at least one optical filter VII between the sixth lens and the image plane IP. The at least one optical filter VII may include, for example, at least one of a low pass filter, an IR-cut filter, and a cover glass. For example, when including an IR-cut filter as the at least one optical filter VII, the super wide-angle lens allows visible light to be transmitted and infrared light to be emitted outside the super wide-angle lens, thereby allowing infrared light not to be delivered to the image plane IP. However, the super wide-angle lens may not include the at least one optical filter VII.

The front lens group and the rear lens group may include at least one aspheric lens. For example, at least one of the first to sixth lenses I to IV may be an aspheric lens. For example, all of the first to sixth lenses I to IV may be aspheric lenses.

In a lens optical system according to one or more aspects of the disclosed embodiment, which has the configuration set forth above, at least one of the first to sixth lenses I to IV may include a plastic material. For example, all of the first to sixth lenses I to IV may include plastic materials. A plastic lens may have a lighter weight and be more advantageous in mass production than a glass lens. However, the materials of the first to sixth lenses I to IV are not limited to plastics. The at least one of the first to sixth lenses I to IV may include glass, as needed. A glass lens may secure higher reliability than a plastic lens. For example, since an aspheric surface may be applied to a glass lens, the glass lens may have various effects such as reduction in length through the lens, compactification, aberration correction, and higher performance, obtained due to the aspheric surface. For example, some of the first to sixth lenses I to IV may be plastic lenses, and the others may be glass lenses.

The super wide-angle lens according to the presently disclosed embodiment may have a wide field of view, for example, a field of view of 100 degree or more, and may exhibit good performance. The super wide-angle lens according to the present embodiment may have a small length through the lens, which is enough to be mounted in a mobile phone simultaneously with exhibiting wide angle capabilities.

The super wide-angle lens according to the presently disclosed embodiment may satisfy the following condition:

$$100 < FOV < 160 \qquad \text{Condition (1)}$$

where FOV (unit: °) refers to the field of view of the super wide-angle lens.

The super wide-angle lens according to the present embodiment may satisfy the following condition:

$$0.7 < TTL/IH < 1.0 \qquad \text{Condition (2)}$$

where TTL (unit: mm) refers to a distance from a center of an entrance surface of the first lens to the image plane, and IH (unit: mm) refers to an image height.

Since the super wide-angle lens satisfying Condition (2) may have a reduced length through the lens relative to the size of the image plane IP, the super wide-angle lens may have a small length through the lens, which is enough to be mounted in a mobile phone simultaneously with serving as a wide-angle lens.

The super wide-angle lens according to the presently disclosed embodiment may satisfy the following condition:

$$DiaL3 < DiaL1 < DiaL6 \qquad \text{Condition (3)}$$

where DiaL1, DiaL3, and DiaL6 respectively refer to effective diameters of the first lens I, the third lens II, and the sixth lens IV.

Condition (3) is a condition for allowing the super wide-angle lens to maintain wide-angle capabilities and high performance, and the effective diameter of the first lens I may be greater than the effective diameter of the third lens III and less than the effective diameter of the sixth lens IV.

The super wide-angle lens according to the presently disclosed embodiment may satisfy the following condition:

$$0.3 < (L1toL2)/OAL < 0.45 \qquad \text{Condition (4)}$$

where L1toL2 (unit: mm) refers to a distance between the center of the entrance surface 1* of the first lens I and a center of the exit surface 4* of the second lens II, and OAL (unit: mm) refers to a distance between the center of the entrance surface 1* of the first lens I and a center of the exit surface 13* of the sixth lens IV.

Condition (4) is a condition for allowing the super wide-angle lens to maintain wide-angle capabilities and high performance, a ratio of thicknesses of the first lens I and the second lens II to a total thickness of the lens groups may be limited to a certain ratio.

The super wide-angle lens according to the presently disclosed embodiment may satisfy at least one of the following conditions:

$0.7<Ind3/Ind4<1.5$  Condition (5)

$1.5<Abv3/Abv4<3.0$  Condition (6)

$0.7<Ind3/Ind6<1.5$  Condition (7)

$1.5<Abv3/Abv6<3.0$  Condition (8)

where Abv3, Abv4, and Abv6 respectively refer to Abbe's numbers of the third lens III, the fourth lens IV, and the sixth lens VI, and Ind3, Ind4, and Ind6 respectively refer to refractive indices of the third lens III, the fourth lens IV, and the sixth lens VI.

In the super wide-angle lens satisfying Condition (5), a low-refractive index lens may be used as the third lens III, and a high-refractive index lens may be used as the fourth lens IV, thereby reducing chromatic aberration. In the super wide-angle lens satisfying Condition (6), the third lens III may have a high Abbe's number, and the fourth lens IV may have a low Abbe's number, thereby reducing chromatic aberration. In the super wide-angle lens satisfying Condition (7), a low-refractive index lens may be used as the third lens III, and a high-refractive index lens may be used as the sixth lens VI, thereby reducing chromatic aberration. In the super wide-angle lens satisfying Condition (8), the third lens III may have a high Abbe's number, and the sixth lens VI may have a low Abbe's number, thereby reducing chromatic aberration.

In the super wide-angle lens according to one or more aspects of the disclosed embodiment, aspheric surfaces are defined as follows.

When a direction of an optical axis is defined as an x axis, a direction perpendicular to the direction of the optical axis is defined as a y axis, and a light travelling direction is defined as a positive direction, an aspheric shape may be represented by the following equation. In the following equation, x denotes a distance measured from the vertex of a lens in the optical axis direction; y denotes a distance measured from the optical axis in the direction perpendicular to the direction of the optical axis; K denotes a conic constant; A, B, C, D, E, and F denote aspheric coefficients; and c' denotes the reciprocal (1/R) of a radius of curvature at the vertex of the lens.

<Aspheric Surface Equation>

$$x = \frac{c'y^2}{1+\sqrt{1-(K+1)c'^2y^2}} + Ay^4 + B6 + Cy^8 + Dy^{10} + Ey^{12} + Fy^{14}$$

The super wide-angle lens will be explained in more detail with reference to aspects of the disclosed embodiment according to various designs as follows.

In each aspect of the disclosed embodiment, lens surface numbers (1, 2, 3, . . . , n: n is a natural number) are sequentially given from the object OBJ side toward the image plane IP side, and reference numerals of lens surfaces are shown in the accompanying drawings. In addition, OBJ denotes an object; EFL denotes a focal length of each lens; F-no denotes an F number; FOV denotes a field of view; R denotes a radius of curvature; Dn denotes a thickness of a lens, or an air gap between two lenses; Nd denotes a refractive index; Vd denotes an Abbe's number; ST denotes an aperture stop; and * denotes an aspheric surface.

First Aspect of the Disclosed Embodiment

FIG. 1 shows a super wide-angle lens according to the first aspect of the disclosed embodiment, and the following table shows design data of the first aspect of the disclosed embodiment.

TABLE 1

| | Surface | R | D | Nd | Vd |
|---|---|---|---|---|---|
| I | 1* | 1.64189 | 0.20000 | 1.54410 | 56.09278 |
| | 2* | 0.61065 | 0.54600 | | |
| II | 3* | 1.87426 | 0.56110 | 1.54410 | 56.09278 |
| | 4* | −4.89243 | 0.02000 | | |
| | ST | Infinity | 0.04404 | | |
| III | 6* | −28.90314 | 0.40037 | 1.54410 | 56.09278 |
| | 7* | −1.20836 | 0.07496 | | |
| IV | 8* | 8.74404 | 0.20000 | 1.65041 | 21.47439 |
| | 9* | 1.68274 | 0.21960 | | |
| V | 10* | −16.69326 | 0.70659 | 1.54410 | 56.09278 |
| | 11* | −0.75830 | 0.03000 | | |
| VI | 12* | 0.90135 | 0.24000 | 1.63916 | 23.51650 |
| | 13* | 0.52299 | 0.40000 | | |
| VII | 14 | Infinity | 0.11000 | 1.51680 | 64.19733 |
| | 15 | Infinity | 0.71734 | | |
| | IP | Infinity | 0.00000 | | |

The following table shows aspheric coefficients of the first aspect of the disclosed embodiment.

TABLE 2

| Surface | K | A | B | C | D | E | F |
|---|---|---|---|---|---|---|---|
| 1* | 0.00000 | 0.06238 | −0.16012 | 0.03034 | 0.02030 | −0.01082 | 0.00000 |
| 2* | −0.48768 | 0.15481 | 0.94333 | −7.37311 | 24.55379 | −44.90545 | 26.46483 |
| 3* | −11.28293 | 0.08343 | −0.20916 | −1.22051 | 2.21642 | −2.90389 | 2.25426 |
| 4* | 0.00000 | −0.36569 | −0.83383 | 9.09693 | −31.08353 | 38.55340 | 0.00000 |
| 6* | 0.00000 | −0.42095 | −2.48131 | 16.09019 | −59.54827 | 0.00000 | 0.00000 |
| 7* | 3.13008 | −0.62064 | 2.38985 | −11.73569 | 30.43838 | −35.58902 | 3.40389 |
| 8* | 0.00000 | −1.31076 | 3.57725 | −13.73857 | 25.43772 | −16.78123 | −16.14668 |
| 9* | −0.18484 | −0.81683 | 2.16519 | −5.16297 | 8.00748 | −7.05515 | 2.58206 |
| 10* | 0.00000 | −0.02492 | −0.40123 | 1.45599 | −2.27052 | 1.82566 | −0.62743 |
| 11* | −0.76253 | 0.49069 | −0.93055 | 1.43682 | −1.49741 | 1.00358 | −0.27971 |
| 12* | −7.31604 | −0.22392 | 0.04486 | 0.00939 | −0.00250 | 0.00000 | 0.00000 |
| 13* | −3.92497 | −0.21088 | 0.12101 | −0.05773 | 0.01777 | −0.00312 | 0.00024 |

Figure 2A:
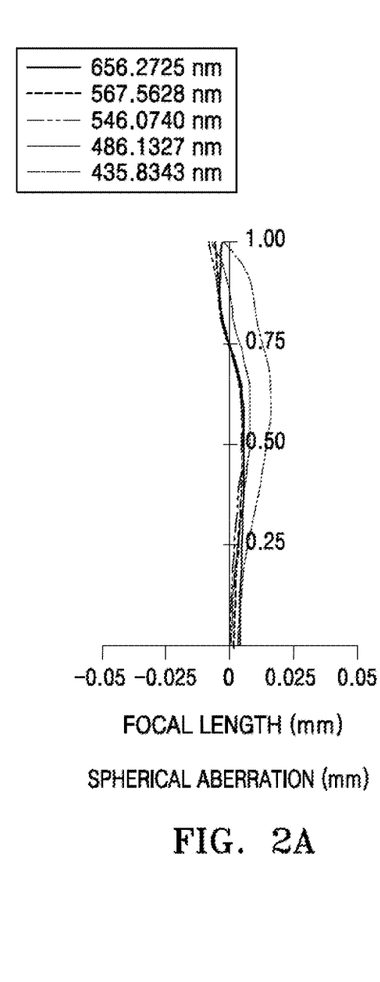
FIGS. 2A through 2C show aberration diagrams depicting spherical aberration, astigmatic field curves, and distortion of the a super wide-angle lens according to the first aspect of the disclosed embodiment.
Figure 2B:
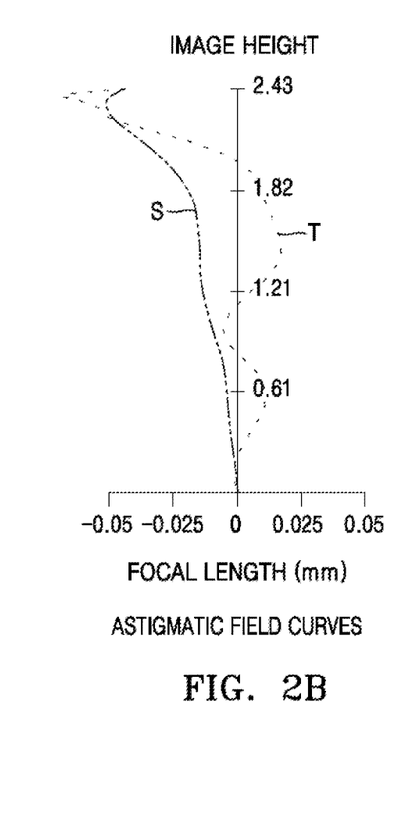
Figure 2C:
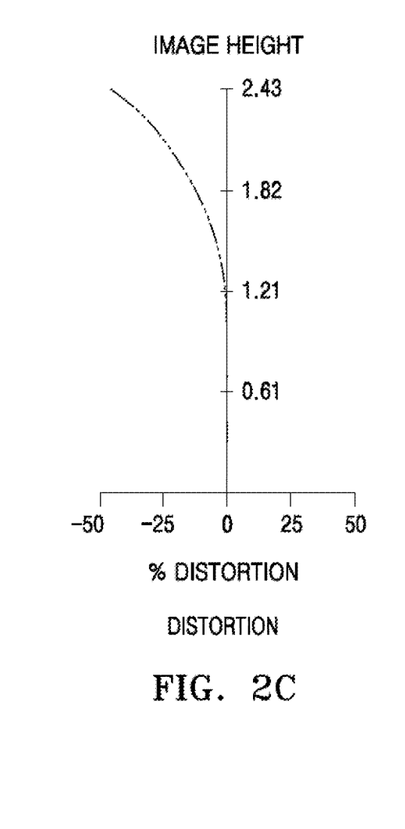

FIGS. 2A-2C show longitudinal spherical aberration, astigmatic field curves, and distortion of the super wide-angle lens according to the first aspect of the disclosed embodiment. The diagram relating to astigmatic field curves shows a curve T depicting tangential field curvature and a curve S depicting sagittal field curvature.

Second Aspect of the Disclosed Embodiment

Figure 3:
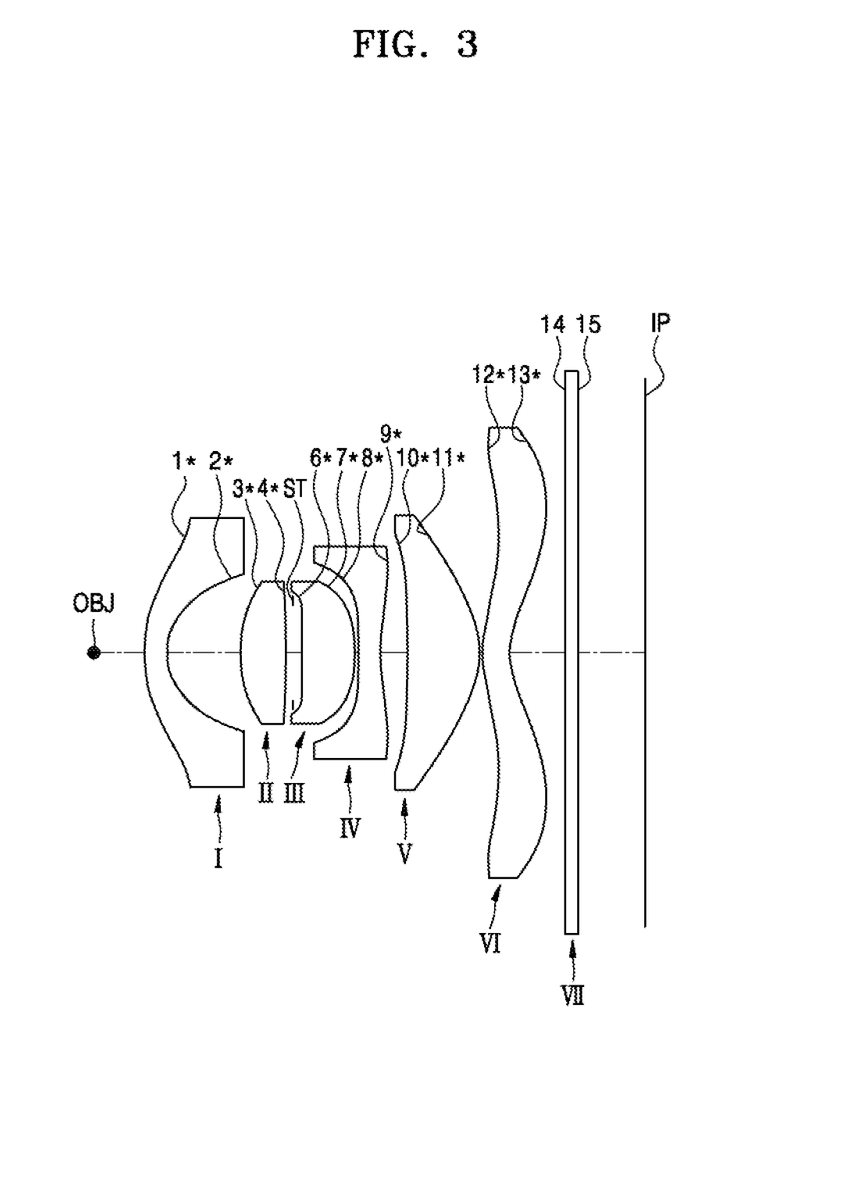
FIG. 3 is a schematic cross-sectional view illustrating an arrangement of main components of a super wide-angle lens according to a second aspect of the disclosed embodiment.

FIG. 3 shows a super wide-angle lens according to a second aspect of the disclosed embodiment, and the following table shows design data of the second aspect of the disclosed embodiment.

TABLE 3

| | Surface | R | D | Nd | Vd |
|---|---|---|---|---|---|
| I | 1* | 1.54302 | 0.20000 | 1.54410 | 56.09278 |
| | 2* | 0.59356 | 0.66010 | | |

TABLE 3-continued

| | Surface | R | D | Nd | Vd |
|---|---|---|---|---|---|
| II | 3* | 1.38790 | 0.40001 | 1.54410 | 56.09278 |
| | 4* | −126.87409 | 0.06516 | | |
| | ST | Infinity | 0.07981 | | |
| III | 6* | 8.74369 | 0.47406 | 1.54410 | 56.09278 |
| | 7* | −1.23214 | 0.03000 | | |
| IV | 8* | 24.29459 | 0.20000 | 1.65041 | 21.47439 |
| | 9* | 1.82952 | 0.24540 | | |
| V | 10* | −7.42444 | 0.63984 | 1.54410 | 56.09278 |
| | 11* | −0.77156 | 0.03000 | | |
| VI | 12* | 1.07683 | 0.24000 | 1.63916 | 23.51650 |
| | 13* | 0.61217 | 0.50000 | | |
| VII | 14 | Infinity | 0.11000 | 1.51680 | 64.19733 |
| | 15 | Infinity | 0.59562 | | |
| | IP | Infinity | 0.00030 | | |

The following table shows aspheric coefficients of the second aspect of the disclosed embodiment.

TABLE 4

| Surface | K | A | B | C | D | E | F |
|---|---|---|---|---|---|---|---|
| 1* | 0.00000 | 0.37841 | −0.83009 | 0.65483 | −0.26987 | 0.04343 | 0.00000 |
| 2* | −0.34970 | 0.58418 | 0.46744 | −7.89904 | 22.35092 | −34.90484 | 26.46525 |
| 3* | 0.53507 | 0.08155 | 0.05494 | −0.11027 | 2.96055 | −2.90389 | 2.25426 |
| 4* | 0.00000 | −0.10382 | −0.37884 | 1.62342 | 4.37274 | −44.53743 | 73.52403 |
| 8* | 38.27983 | −0.19192 | −2.86927 | 28.59727 | −243.01383 | 968.75271 | −1707.2486 |
| 7* | 2.71370 | −0.53851 | 3.90381 | −19.34227 | 40.29529 | −35.58902 | 3.40389 |
| 8* | 0.00000 | −1.08415 | 3.40658 | −12.04401 | 17.18882 | −10.00595 | 0.00000 |
| 9* | 0.49359 | −0.63026 | 1.31102 | −2.61440 | 3.33185 | −2.44353 | 0.78394 |
| 10* | 0.00000 | −0.06584 | 0.49803 | −1.39824 | 1.82690 | −1.20479 | 0.31858 |
| 11* | −0.82325 | 0.37766 | −0.10231 | 0.18354 | −0.46038 | 0.37055 | −0.09554 |
| 12* | −13.31294 | −0.08820 | 0.02147 | −0.00249 | 0.00024 | 0.00000 | 0.00000 |
| 13* | −4.64147 | −0.13826 | 0.07725 | −0.03790 | 0.01237 | −0.00235 | 0.00019 |

Figure 4A:
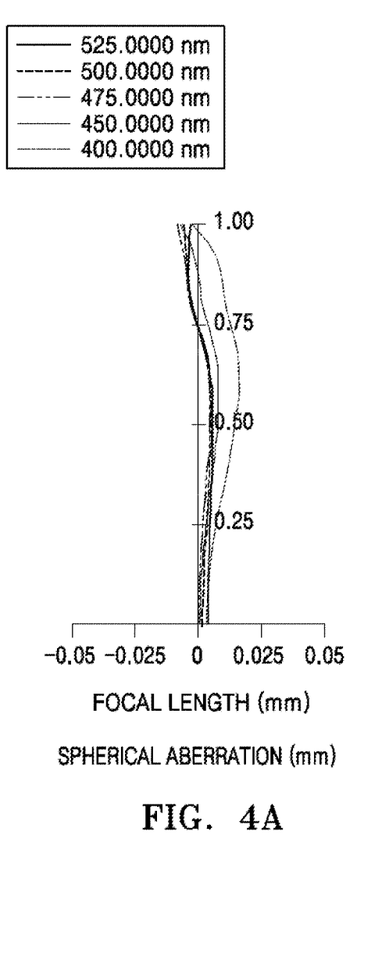
FIGS. 4A through 4C show aberration diagrams depicting spherical aberration, astigmatic field curves, and distortion of the super wide-angle lens according to the second aspect of the disclosed embodiment.
Figure 4B:
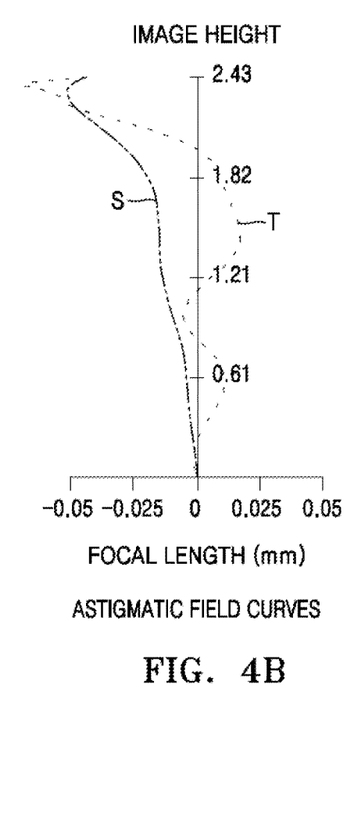
Figure 4C:
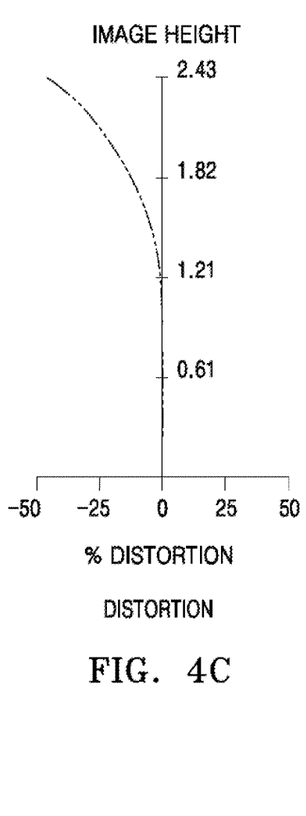

FIGS. 4A-4C show longitudinal spherical aberration, astigmatic field curves, and distortion of the super wide-angle lens according to the second aspect of the disclosed embodiment.

Third Aspect of the Disclosed Embodiment

Figure 5:
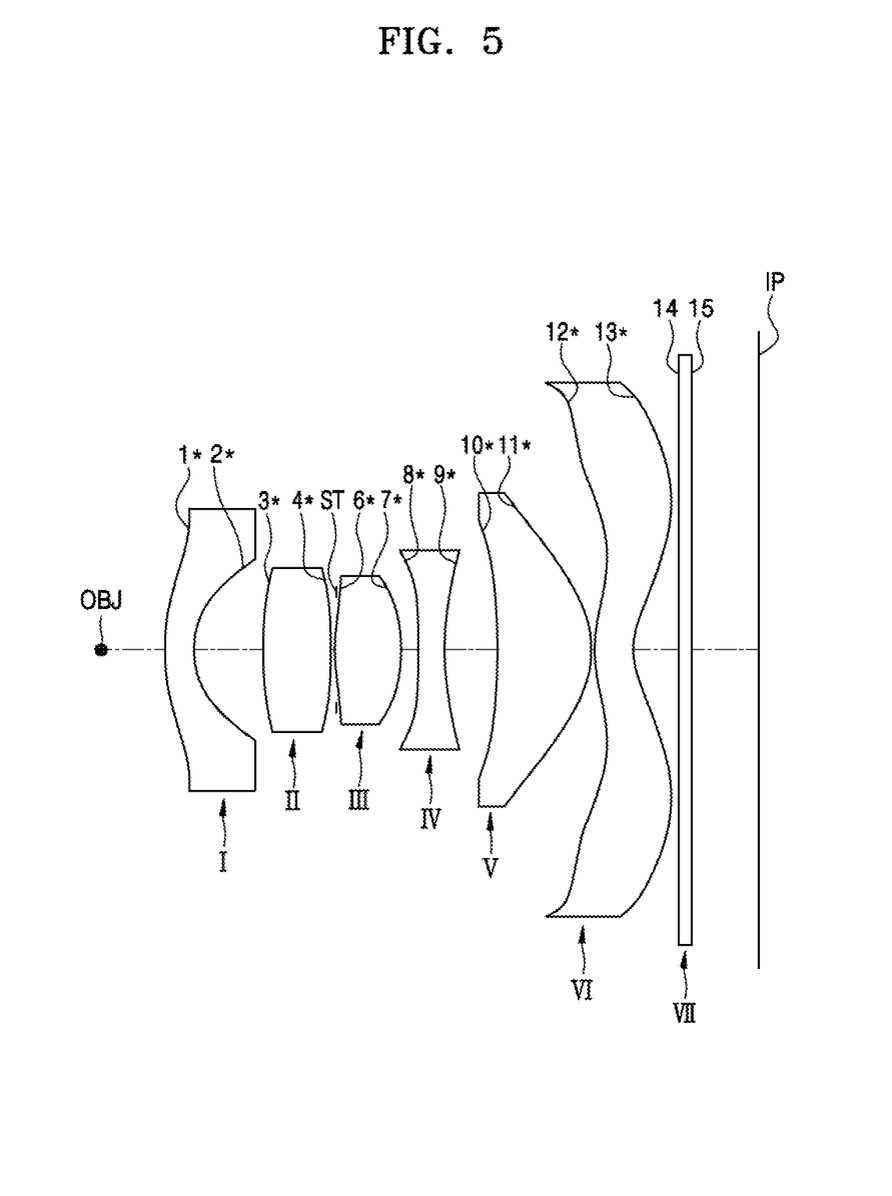
FIG. 5 is a schematic cross-sectional view illustrating an arrangement of main components of a super wide-angle lens according to a third aspect of the disclosed embodiment.

FIG. 5 shows a super wide-angle lens according to a third aspect of the disclosed embodiment, and the following table shows design data of the third aspect of the disclosed embodiment.

TABLE 5

| | Surface | R | D | Nd | Vd |
|---|---|---|---|---|---|
| I | 1* | 2.06469 | 0.22756 | 1.53175 | 55.85588 |
| | 2* | 0.70606 | 0.53807 | | |
| II | 3* | 4.30203 | 0.52697 | 1.53175 | 55.85588 |
| | 4* | −4.41575 | 0.04000 | | |
| | ST | Infinity | −0.00994 | | |
| III | 6* | 1.80965 | 0.51593 | 1.53175 | 55.85588 |
| | 7* | −1.33637 | 0.13112 | | |
| IV | 8* | 15.50065 | 0.20400 | 1.65041 | 21.47439 |
| | 9* | 1.65713 | 0.41656 | | |
| V | 10* | −3.65019 | 0.72385 | 1.54410 | 56.09278 |
| | 11* | −0.72467 | 0.03000 | | |
| VI | 12* | 1.03955 | 0.30000 | 1.63916 | 23.51650 |
| | 13* | 0.55121 | 0.35000 | | |
| VII | 14 | Infinity | 0.11000 | 1.51680 | 64.19733 |
| | 15 | Infinity | 0.36088 | | |
| | IP | Infinity | 0.00500 | | |

The following table shows aspheric coefficients of the third aspect of the disclosed embodiment.

TABLE 6

| Surface | K | A | B | C | D | E | F |
|---|---|---|---|---|---|---|---|
| 1* | 0.00000 | 0.25124 | −0.52511 | 0.18448 | 0.04787 | −0.02709 | 0.00000 |
| 2* | −0.15450 | 0.43521 | 0.48091 | −7.16396 | 22.16145 | −40.56551 | 26.46525 |
| 3* | 30.90326 | 0.05741 | 0.10987 | −0.38028 | 0.84589 | −2.90389 | 2.25426 |
| 4* | 0.00000 | −0.56872 | 4.80136 | −28.81584 | 110.64849 | −234.29303 | 195.36103 |
| 6* | −7.64547 | −0.56657 | 5.52584 | −44.06239 | 209.46689 | −591.95284 | 711.94970 |
| 7* | 2.55527 | −0.45050 | 2.26504 | −7.94367 | 16.28500 | −21.78641 | 12.91080 |
| 8* | 0.00000 | −1.17945 | 3.22261 | −3.73959 | −9.73117 | 32.84894 | −26.27671 |
| 9* | 1.67724 | −0.79199 | 2.23504 | −3.90951 | 3.17544 | −0.32600 | −0.77171 |
| 10* | 10.82727 | 0.19168 | −0.65829 | 1.24740 | −1.30376 | 0.78688 | −0.20992 |
| 11* | −0.82551 | 0.47806 | −0.51946 | 0.37794 | −0.14927 | 0.08590 | −0.03255 |
| 12* | −10.44873 | −0.16635 | −0.12514 | 0.17437 | −0.07213 | 0.01339 | −0.00096 |
| 13* | −4.20005 | −0.21646 | 0.13381 | −0.06312 | 0.01804 | −0.00265 | 0.00015 |

Figure 6A:
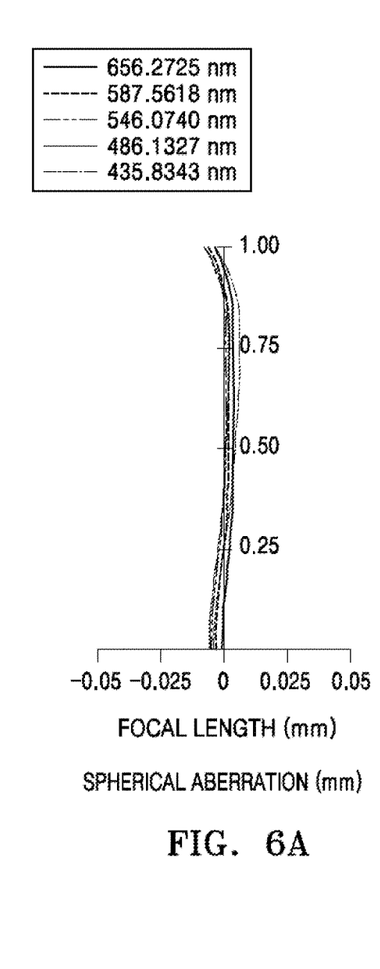
FIGS. 6A through 6C show aberration diagrams depicting spherical aberration, astigmatic field curves, and distortion of the super wide-angle lens according to the third aspect of the disclosed embodiment.
Figure 6B:
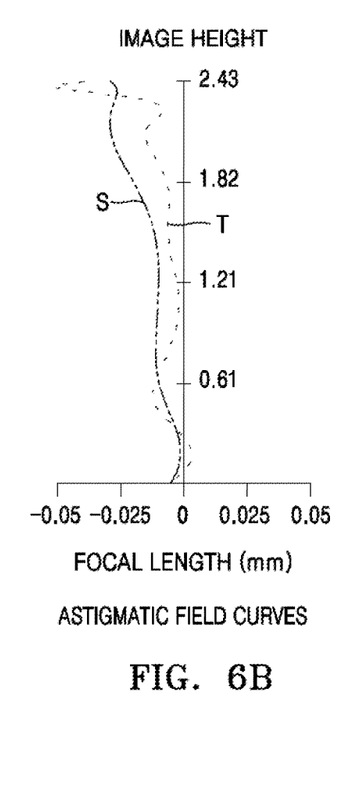
Figure 6C:
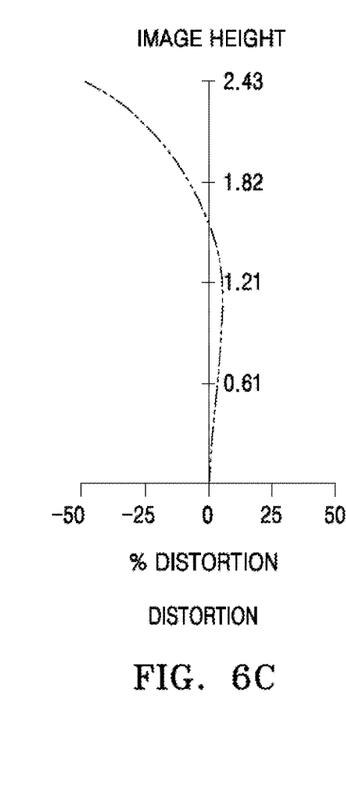

FIGS. 6A-6C show longitudinal spherical aberration, astigmatic field curves, and distortion of the super wide-angle lens according to the third aspect of the disclosed embodiment.

F-numbers (Fno), focal lengths (f), and fields of view (FOV) of the super wide-angle lenses according to the first to third aspects of the disclosed embodiment are shown in the following Table 7.

TABLE 7

| Embodiment | F-number (Fno) | Focal length (f) [mm] | Field of view (FOV) [°] |
|---|---|---|---|
| First Embodiment | 2.40 | 1.46 | 143.90 |
| Second Embodiment | 2.38 | 1.46 | 144.49 |
| Third Embodiment | 2.48 | 1.46 | 145.66 |

The following table shows that the super wide-angle lenses according to the first to third aspects of the disclosed embodiment satisfy Conditions (1) to (8). In Table 8, FOV (field of view) is given in units of °.

TABLE 8

| Condition | Inequality | First Embodiment | Second Embodiment | Third Embodiment |
|---|---|---|---|---|
| Condition (1) | 100 < Fov < 160 | 143.90 | 144.49 | 145.66 |
| Condition (2) | 0.7 < TTL/IH < 1.0 | 0.92 | 0.92 | 0.92 |
| Condition (3) | DiaL3 < DiaL1 < DiaL6 | — | — | — |
| Condition (4) | 0.3 < (L1toL2)/OAL < 0.45 | 0.40 | 0.39 | 0.35 |
| Condition (5) | 0.7 < Ind3/Ind4 < 1.5 | 0.94 | 0.94 | 0.93 |
| Condition (6) | 1.5 < Abv3/Abv4 < 3.0 | 2.61 | 2.61 | 2.60 |
| Condition (7) | 0.7 < Ind3/Ind6 < 1.5 | 0.94 | 0.94 | 0.93 |
| Condition (8) | 1.5 < Abv3/Abv6 < 3.0 | 2.39 | 2.39 | 2.38 |

Table 9 shows values of variables required to obtain results of Table 8. In Table 9, values of TTL, IH, DiaL1, DiaL2, DiaL3, L1toL2, and OAL are given in units of mm.

TABLE 9

| Variable | First Embodiment | Second Embodiment | Third Embodiment |
|---|---|---|---|
| TTL | 4.47 | 4.47 | 4.47 |
| IH | 4.85 | 4.85 | 4.85 |
| DiaL3 | 1.120 | 1.250 | 1.141 |
| DiaL1 | 2.342 | 2.377 | 2.171 |
| DiaL6 | 3.779 | 3.986 | 4.119 |
| L1toL2 | 1.307 | 1.260 | 1.293 |
| OAL | 3.24 | 3.26 | 3.64 |
| Ind3 | 1.544 | 1.544 | 1.532 |
| Ind4 | 1.650 | 1.650 | 1.650 |
| Ind6 | 1.639 | 1.639 | 1.639 |
| Abv3 | 56.093 | 56.093 | 55.856 |
| Abv4 | 21.474 | 21.474 | 21.474 |
| Abv6 | 23.517 | 23.517 | 23.517 |

Figure 7:
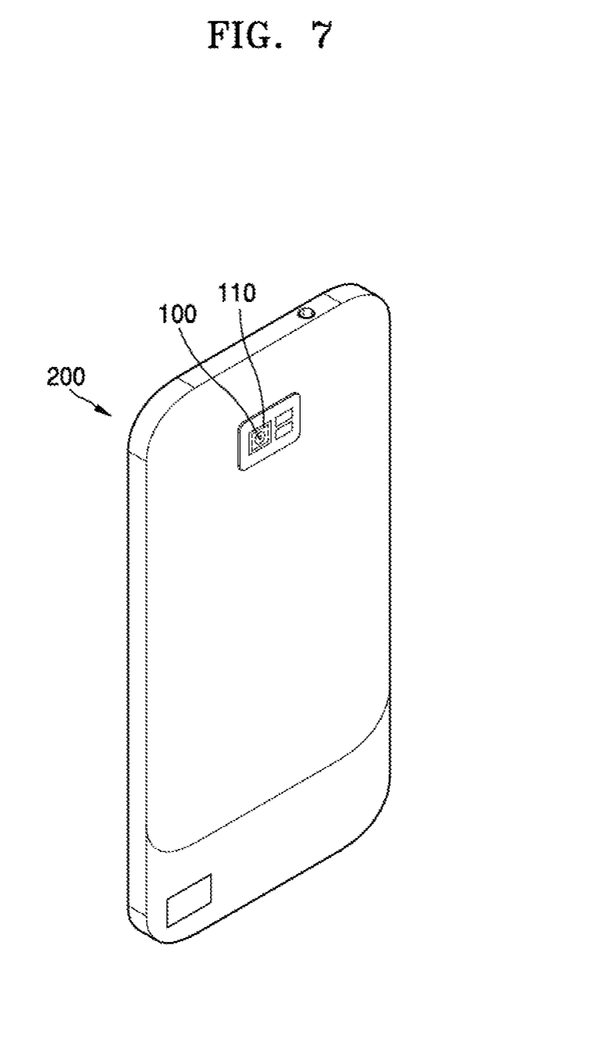
FIG. 7 is a schematic perspective view illustrating an imaging device including a super wide-angle lens according to one or more aspects of the disclosed embodiment.

FIG. 7 shows an imaging device 200 including a super wide-angle lens according to an aspect of the disclosed embodiment. The imaging device 200 includes a super wide-angle lens 100, and an image sensor 110 receiving an image formed by the super wide-angle lens 100 and converting the image into an electrical image signal. The super wide-angle lens 100 may include the super wide-angle lenses described with reference to FIGS. 1 to 6C. The super wide-angle lens 100 according to the disclosed embodiment may be applied to an imaging device such as a small-size digital camera, a mobile phone camera, an automotive camera, or the like, thereby realizing the imaging device capable of taking images with wide angles and high performance.

The imaging device 200 shown in FIG. 7 is merely a general example, and the super wide-angle lens 100 may be applied to a wider range of optical apparatuses. For example, the super wide-angle lens 100 according to the presently disclosed embodiment may be applied to a lens system of an automotive camera. In addition, the super wide-angle lenses according to one or more aspects of the disclosed embodiment may also be applied to virtual reality devices, augmented reality devices, or the like. For example, the super wide-angle lenses according to one or more aspects of the disclosed embodiment described above may be arranged in a virtual reality device so as to face directions opposite to each other. For example, the super wide-angle lens according to one or more aspects of the disclosed embodiment may also be applied to various automotive devices such as black boxes, around view monitoring (AVM) systems, rearview cameras, or the like. In addition, the super wide-angle lens may be applied to various action cams such as drones or leisure sports camcorders. Further, the super wide-angle lens may be applied to various surveillance cameras.

The super wide-angle lens according to one or more aspects of the disclosed embodiment may have a wide field of view and a reduced size. The super wide-angle lens according to one or more aspects of the disclosed embodiment allows a low-sensitivity design to be realized simultaneously with exhibiting high performance by dispersing optical power.

It will be understood by those of ordinary skill in the art that, even though the shapes of the lenses in the super wide-angle lens according to one or more aspects of the disclosed embodiment are somewhat changed, the super wide-angle lens may have the effects as described above when satisfying at least one of Conditions (1) to (8) set forth above. In addition, it will be understood that, even though not satisfying at least some of Conditions (1) to (8), the super wide-angle lens may have the effects as described above when the refractive power arrangement, shape conditions, and other conditions of the lenses are satisfied.

It should be understood that aspects of the disclosed embodiment described herein should be considered in a descriptive sense only and not for purposes of limitation. Descriptions of features within each aspect of the disclosed embodiment should typically be considered as available for other similar features in other aspects of the disclosed embodiments.

While one or more aspects of the disclosed embodiment have been described with reference to the figures, it will be understood by those of ordinary skill in the art that various changes in form and details may be made therein without departing from the spirit and scope of the disclosure as defined by the following claims.

What is claimed is:

1. A super wide-angle lens comprising:
a first lens having a negative refractive power;
a second lens having a positive refractive power;
a third lens having a positive refractive power;
a fourth lens having a negative refractive power;
a fifth lens having a positive refractive power; and
a sixth lens having a negative refractive power,
wherein the first to sixth lenses are arranged from an object side toward an image plane side in this stated order, and the super wide-angle lens satisfies all of the following conditions:

$$100 < FOV < 160 \qquad \text{Condition (1)}$$

$$0.7 < TTL/IH < 1.0 \qquad \text{Condition (2)}$$

where FOV (unit: °) refers to a field of view of the super wide-angle lens, TTL (unit: mm) refers to a distance from a center of an entrance surface of the first lens to the image plane, and IH (unit: mm) refers to an image height.

2. The super wide-angle lens according to claim 1, wherein the super wide-angle lens satisfies the following condition:

$$0.7 < Ind3/Ind4 < 1.5 \qquad \text{Condition (3)}$$

where Ind3 and Ind4 respectively refer to refractive indices of the third lens and the fourth lens.

3. The super wide-angle lens according to claim 1, wherein the super wide-angle lens satisfies the following condition:

$$DiaL3 < DiaL1 < DiaL6 \qquad \text{Condition (4)}$$

where DiaL1, DiaL3, and DiaL6 respectively refer to effective diameters of the first lens, the third lens, and the sixth lens.

4. The super wide-angle lens according to claim 1, wherein the super wide-angle lens satisfies the following condition:

$$0.3 < (L1toL2)/OAL < 0.45 \qquad \text{Condition (5)}$$

where L1toL2 (unit: mm) refers to a distance between the center of the entrance surface of the first lens and a center of an exit surface of the second lens, and OAL (unit: mm) refers to a distance between the center of the entrance surface of the first lens and a center of an exit surface of the sixth lens.

5. The super wide-angle lens according to claim 1, further comprising an aperture stop between the second lens and the third lens.

6. The super wide-angle lens according to claim 1, wherein the super wide-angle lens satisfies at least one of the following conditions:

$$1.5 < Abv3/Abv4 < 3.0 \qquad \text{Condition (6)}$$

$$0.7 < Ind3/Ind6 < 1.5 \qquad \text{Condition (7)}$$

$$1.5 < Abv3/Abv6 < 3.0 \qquad \text{Condition (8)}$$

where Abv3, Abv4, and Abv6 respectively refer to Abbe's numbers of the third lens, the fourth lens, and the sixth lens, and Ind3 and Ind6 respectively refer to refractive indices of the third lens and the sixth lens.

7. The super wide-angle lens according to claim 1, wherein at least one of the first to sixth lenses is an aspheric lens.

8. The super wide-angle lens according to claim 1, wherein at least one of the first to sixth lenses is a plastic lens.

9. The super wide-angle lens according to claim 1, wherein an exit surface of the first lens is concave toward the image plane side.

10. The super wide-angle lens according to claim 1, wherein at least one of an entrance surface and an exit surface of the sixth lens has at least one inflection point.

11. The super wide-angle lens according to claim 10, wherein the at least one of the entrance surface and the exit surface of the sixth lens is concave toward the image plane side in a central portion thereof and becomes convex toward the image plane side in a region between the central portion and an edge thereof.

12. The super wide-angle lens according to claim 1, wherein the entrance surface of the first lens has a meniscus shape convex toward the object side.

13. The super wide-angle lens according to claim 1, wherein the super wide-angle lens satisfies at least one of the following conditions:

$$1.5 < Abv3/Abv4 < 3.0 \qquad \text{Condition (6')}$$

$$0.7 < Ind3/Ind6 < 1.5 \qquad \text{Condition (7')}$$

$$1.5 < Abv3/Abv6 < 3.0 \qquad \text{Condition (8')}$$

where Abv3, Abv4, and Abv6 respectively refer to Abbe's numbers of the third lens, the fourth lens, and the image plane lens, and Ind3 and Ind6 respectively refer to refractive indices of the third lens and the image plane lens.

14. An imaging device comprising:
the super wide-angle lens according to claim 1; and
a solid-state imaging element taking an image formed by the super wide-angle lens.

15. A super wide-angle lens comprising a front lens group, an aperture stop, and a rear lens group, which are arranged from an object side toward an image plane side in this stated order, wherein the front lens group comprises a first lens having an exit surface concave toward the image plane side, and a second lens having an entrance surface convex toward the object side, the rear lens group comprises a third lens, a fourth lens, a fifth lens and a sixth lens, the third lens being arranged closest to the object side and having an exit surface concave toward the image plane side, and the sixth lens being an image plane lens arranged closest to the image plane side and having a negative refractive power, and the super wide-angle lens satisfies all of the following conditions:

$$100 < FOV < 160 \quad \text{Condition (1')}$$

$$0.7 < Ind3/Ind4 < 1.5 \quad \text{Condition (2')}$$

where FOV (unit: °) refers to a field of view of the super wide-angle lens, and Ind3 and Ind4 respectively refer to refractive indices of the third lens and the fourth lens, and wherein the fourth lens has a negative refractive power, the fifth lens has a positive refractive power, and the fourth lens and the fifth lens are arranged between the third lens and the image plane lens and from the object side toward the image plane side in this stated order.

16. The super wide-angle lens according to claim 15, wherein the super wide-angle lens satisfies all of the following conditions:

$$DiaL3 < DiaL1 < DiaL6 \quad \text{Condition (3')}$$

$$0.7 < TTL/IH < 1.0 \quad \text{Condition (4')}$$

where DiaL1, DiaL3, and DiaL6 respectively refer to effective diameters of the first lens, the third lens, and the image plane lens, TTL (unit: mm) refers to a distance from a center of an entrance surface of the first lens to the image plane, and IH (unit: mm) refers to an image height.

17. The super wide-angle lens according to claim 15, wherein the super wide-angle lens satisfies the following condition:

$$0.3 < (L1toL2)/OAL < 0.45 \quad \text{Condition (5')}$$

where L1toL2 (unit: mm) refers to a distance between a center of an entrance surface of the first lens and a center of an exit surface of the second lens, and OAL (unit: mm) refers to a distance between the center of the entrance surface of the first lens and a center of an exit surface of the image plane lens.

18. The super wide-angle lens according to claim 15, wherein at least one of an entrance surface and an exit surface of the image plane lens has at least one inflection point between a central portion and an edge of the at least one surface.

19. The super wide-angle lens according to claim 15, wherein at least one of the lenses constituting the front lens group and the rear lens group is an aspheric lens.

* * * * *